United States Patent
Wu et al.

(10) Patent No.: US 10,542,438 B2
(45) Date of Patent: Jan. 21, 2020

(54) METHOD FOR DETECTING SIGNAL ON UNLICENSED SPECTRUM CHANNEL, USER EQUIPMENT, AND BASE STATION

(71) Applicant: Huawei Technologies Co., Ltd., Shenzhen (CN)

(72) Inventors: Zuomin Wu, Beijing (CN); David Jean-Marie Mazzarese, Beijing (CN); Qiang Li, Shenzhen (CN); Sha Ma, Beijing (CN); Yuan Xia, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/810,794

(22) Filed: Nov. 13, 2017

(65) Prior Publication Data

US 2018/0070244 A1    Mar. 8, 2018

Related U.S. Application Data

(63) Continuation of application No. PCT/CN2015/078936, filed on May 14, 2015.

(51) Int. Cl.
*H04W 16/14* (2009.01)
*H04W 72/04* (2009.01)
*H04W 74/08* (2009.01)

(52) U.S. Cl.
CPC ......... *H04W 16/14* (2013.01); *H04W 72/042* (2013.01); *H04W 74/0808* (2013.01)

(58) Field of Classification Search
CPC ............. H04W 16/14; H04W 74/0808; H04W 72/042; H04W 74/0816; H04W 52/0229; H04W 52/0216; H04W 84/12; H04W 48/10; H04L 12/28; Y02D 70/00; Y02D 70/144; Y02D 70/142; Y02D 70/1262
See application file for complete search history.

(56) References Cited

U.S. PATENT DOCUMENTS

| | | | |
|---|---|---|---|
| 2009/0143025 A1 | 6/2009 | Linebarger et al. | |
| 2009/0201798 A1* | 8/2009 | Lee | H04W 74/002 370/216 |
| 2010/0184435 A1 | 7/2010 | Shellhammer et al. | |
| 2013/0155894 A1* | 6/2013 | Li | H04W 74/0833 370/252 |

(Continued)

FOREIGN PATENT DOCUMENTS

| | | |
|---|---|---|
| CA | 2371563 A1 | 11/2000 |
| CN | 1360707 A | 7/2002 |

(Continued)

*Primary Examiner* — Brandon J Miller
(74) *Attorney, Agent, or Firm* — Slater Matsil, LLP

(57) ABSTRACT

Embodiments of the present invention disclose a method for detecting a signal on an unlicensed spectrum channel, user equipment, and a base station. The method includes: receiving, by user equipment, instruction information sent by a base station; and starting, by the user equipment according to the instruction information, to detect a signal on an unlicensed spectrum channel. According to the present invention, only when receiving the instruction information sent by the base station, the user equipment detects the signal on the unlicensed spectrum channel according to the instruction information. This reduces power consumption of the user equipment.

18 Claims, 3 Drawing Sheets

S11
User equipment receives instruction information sent by a base station

S12
The user equipment starts to detect a signal on an unlicensed spectrum channel according to the instruction information

(56) References Cited

U.S. PATENT DOCUMENTS

| | | | |
|---|---|---|---|
| 2013/0202068 A1* | 8/2013 | Ly-Gagnon | H04W 52/0225 375/343 |
| 2014/0169290 A1* | 6/2014 | Seok | H04W 4/70 370/329 |
| 2014/0328325 A1* | 11/2014 | Bai | H04W 74/008 370/331 |
| 2014/0362813 A1* | 12/2014 | Hu | H04W 72/042 370/329 |
| 2014/0378157 A1 | 12/2014 | Wei et al. | |
| 2016/0014610 A1* | 1/2016 | Wong | H04W 74/002 455/454 |
| 2016/0192416 A1* | 6/2016 | Nagata | H04W 76/14 370/329 |
| 2016/0249333 A1 | 8/2016 | Freda et al. | |
| 2016/0309451 A1* | 10/2016 | Ye | H04W 72/042 |
| 2017/0245303 A1* | 8/2017 | Falconetti | H04W 74/0808 |
| 2018/0054741 A1* | 2/2018 | Froberg Olsson | H04W 16/14 |

FOREIGN PATENT DOCUMENTS

| | | |
|---|---|---|
| CN | 102293040 A | 12/2011 |
| CN | 103765824 A | 4/2014 |
| CN | 104012159 A | 8/2014 |
| CN | 104301273 A | 1/2015 |
| EP | 3188433 A1 | 7/2017 |
| WO | 2013179095 A1 | 12/2013 |

\* cited by examiner

METHOD FOR DETECTING SIGNAL ON UNLICENSED SPECTRUM CHANNEL, USER EQUIPMENT, AND BASE STATION

CROSS-REFERENCE TO RELATED APPLICATIONS

This application is a continuation of International Application No. PCT/CN2015/078936, filed on May 14, 2015, the disclosure of which is hereby incorporated by reference in its entirety.

TECHNICAL FIELD

Embodiments of the present invention relate to the communications field, and in particular, to a method for detecting a signal on an unlicensed spectrum channel, user equipment, and a base station.

BACKGROUND

In the present field of wireless communications, spectrum resources are mainly classified into two types: a licensed spectrum resource and an unlicensed spectrum resource. The licensed spectrum resource is a spectrum resource allocated by a radio regulatory commission of a government for a particular purpose, for example, a spectrum resource used by a mobile operator or a dedicated spectrum resource for civil aviation, railways, and police. Because of policy exclusivity, service quality of the licensed spectrum resource usually can be ensured, and it is relatively easy to schedule and control the licensed spectrum resource.

The unlicensed spectrum resource is also a spectrum resource allocated by a related government department. However, a radio technology, an operating enterprise, and a service life are not limited, and service quality of such a frequency band is not ensured either. A communications device can use the unlicensed resource for free, as long as requirements of indicators such as transmit power and out-of-band leakage are met. Common communications systems using the unlicensed resource for communication include a civil walkie-talkie, a radio remote control, a Wi-Fi system, a Bluetooth communications system, and the like. In the United States, unlicensed spectrum is defined by the Federal Communications Commission (FCC) under 47 CFR 15.

In an existing Long Term Evolution (LTE) system, a spectrum resource used by an operator is mainly the licensed spectrum resource. As a quantity of users on a mobile communications network increases, and user requirements on a communication rate and service quality become higher, an existing licensed spectrum resource can hardly meet a requirement of the operator's existing service. Considering that a new licensed spectrum is expensive and in shortage, the operator starts to pay attention to the unlicensed spectrum resource, hoping to use the unlicensed spectrum resource to offload a network capacity and improve service quality.

LAA-LTE (licensed-assisted access using LTE) is based on a configuration and a structure of CA (carrier aggregation) in the existing LTE system. That is, a base station uses a carrier on a licensed spectrum as a primary component carrier and a carrier on an unlicensed spectrum as a secondary component carrier. The network capacity is offloaded by using the unlicensed spectrum resource, thereby reducing load of the carrier on the licensed spectrum.

To ensure friendly coexistence of systems and devices that perform communication using the unlicensed spectrum, a listen before talk (LBT) channel access mechanism is introduced in some countries and regions, such as Europe and Japan. A basic idea of LBT is as follows: Before sending a signal on a channel, each communications device needs to detect whether the current channel is clear, that is, whether a nearby node is occupying the channel to send a signal. This detection procedure is referred to as clear channel assessment (CCA). If it is detected that the channel is clear within a period of time, the communications device can send a signal; or if it is detected that the channel is occupied, the communications device cannot send a signal at present. Specifically, in accordance with a provision of a European regulation, the LBT mechanism is further classified into an LBT mechanism for frame based equipment (FBE) and an LBT mechanism for load based equipment (LBE). A channel access mode of the Wi-Fi system is a kind of LBE, and is specifically a carrier sense multiple access with collision avoidance (CSMA/CA) mechanism. In a channel access mechanism of Wi-Fi, when a collision is detected in the system, a contention window grows exponentially, and a length of the contention window may reach 1024. To ensure channel access fairness, a relatively long contention window is likely to be set in the LAA-LTE system. Therefore, when the base station in the LAA-LTE system and multiple other devices using the unlicensed spectrum resource contend for an unlicensed spectrum channel, the LAA-LTE base station may take a relatively long period of time to access the unlicensed spectrum channel. In this case, detection always performed by the user equipment needs to consume a large amount of power.

SUMMARY

The present invention provides a method for detecting a signal on an unlicensed spectrum channel, user equipment, and a base station, so as to reduce power overheads of user equipment.

A first aspect of embodiments of the present invention provides a method for detecting a signal on an unlicensed spectrum channel, including: receiving, by user equipment, instruction information sent by a base station; and starting, by the user equipment according to the instruction information, to detect a signal on an unlicensed spectrum channel.

In a first possible implementation of the first aspect, the instruction information includes a random backoff number; and the starting, by the user equipment according to the instruction information, to detect a signal on an unlicensed spectrum channel includes: determining, by the user equipment according to the random backoff number, a first moment when the base station obtains permission to use the unlicensed spectrum channel, and detecting the signal on the unlicensed spectrum channel according to the first moment.

In a second possible implementation of the first aspect, the instruction information includes a detection start moment; and the starting, by the user equipment according to the instruction information, to detect a signal on an unlicensed spectrum channel includes: detecting, by the user equipment, the signal on the unlicensed spectrum channel according to the detection start moment.

In a third possible implementation of the first aspect, the instruction information includes a first time interval; and the starting, by the user equipment according to the instruction information, to detect a signal on an unlicensed spectrum channel includes: detecting, by the user equipment, the signal on the unlicensed spectrum channel after the first time interval.

In a fourth possible implementation of the first aspect, the instruction information includes a second time interval; and the starting, by the user equipment according to the instruction information, to detect a signal on an unlicensed spectrum channel includes: detecting, by the user equipment, the signal on the unlicensed spectrum channel within the second time interval.

With reference to any one of the first aspect or the first to the fourth possible implementations of the first aspect, in a fifth possible implementation, the user equipment receives the instruction information by using public DCI on a PDCCH or an EPDCCH.

With reference to any one of the first aspect or the first to the fourth possible implementations of the first aspect, in a sixth possible implementation, the user equipment receives the instruction information by using UE-specific DCI on a PDCCH or an EPDCCH.

With reference to any one of the first aspect or the first to the fourth possible implementations of the first aspect, in a seventh possible implementation, the user equipment receives the instruction information by using higher layer signaling.

Correspondingly, a second aspect of the embodiments of the present invention provides user equipment, including: a receiving module, configured to receive instruction information sent by a base station; and a processing module, configured to start to detect a signal on an unlicensed spectrum channel according to the instruction information.

In a first possible implementation of the second aspect, the instruction information includes a random backoff number; and the processing module is configured to: determine, according to the random backoff number, a first moment when the base station obtains permission to use the unlicensed spectrum channel, and detect the signal on the unlicensed spectrum channel according to the first moment.

In a second possible implementation of the second aspect, the instruction information includes a detection start moment; and the processing module is configured to: detect the signal on the unlicensed spectrum channel according to the detection start moment.

In a third possible implementation of the second aspect, the instruction information includes a first time interval; and the processing module is configured to: detect the signal on the unlicensed spectrum channel after the first time interval.

In a fourth possible implementation of the second aspect, the instruction information includes a second time interval; and the processing module is configured to: detect the signal on the unlicensed spectrum channel within the second time interval.

With reference to any one of the second aspect or the first to the fourth possible implementations of the second aspect, in a fifth possible implementation, the receiving module receives the instruction information in public DCI on a PDCCH or an EPDCCH.

With reference to any one of the second aspect or the first to the fourth possible implementations of the second aspect, in a sixth possible implementation, the receiving module receives the instruction information in UE-specific DCI on a PDCCH or an EPDCCH.

With reference to any one of the second aspect or the first to the fourth possible implementations of the second aspect, in a seventh possible implementation, the receiving module receives the instruction information by using higher layer signaling.

A first aspect of the embodiments of the present invention provides a method for detecting a signal on an unlicensed spectrum channel, including: sending, by a base station, instruction information to user equipment, where the instruction information is used to instruct the user equipment to start to detect a signal on an unlicensed spectrum channel.

In a first possible implementation of a third aspect, the method further includes: determining, by the base station, that a random backoff number obtained during extended clear channel assessment ECCA detection is less than or equal to a first preset threshold.

In a second possible implementation of a third aspect, the method further includes: determining, by the base station, that a random backoff number obtained during extended clear channel assessment ECCA detection is greater than or equal to a second preset threshold.

In a third possible implementation of a third aspect, the method further includes: determining, by the base station, to schedule the user equipment on the unlicensed spectrum channel.

In a fourth possible implementation of a third aspect, the method further includes: determining, by the base station, to send downlink data on the unlicensed spectrum channel.

With reference to either of the first or the second possible implementation of the third aspect, in a fifth possible implementation, the instruction information includes the random backoff number, and the instruction information is used to instruct the user equipment to detect the signal on the unlicensed spectrum channel according to the random backoff number.

With reference to any one of the third aspect or the first to the fourth possible implementations of the third aspect, in a sixth possible implementation, the instruction information includes a detection start moment, and the instruction information is used to instruct the user equipment to detect the signal on the unlicensed spectrum channel according to the detection start moment.

With reference to any one of the third aspect or the first to the fourth possible implementations of the third aspect, in a seventh possible implementation, the instruction information includes a first time interval, and the first time interval is used to instruct the user equipment to detect the signal on the unlicensed spectrum channel after the first time interval.

With reference to any one of the third aspect or the first to the fourth possible implementations of the third aspect, in an eighth possible implementation, the instruction information includes a second time interval, and the second time interval is used to instruct the user equipment to detect the signal on the unlicensed spectrum channel within the second time interval.

With reference to any one of the third aspect or the first to the eighth possible implementations of the third aspect, in a ninth possible implementation, the instruction information is carried in public DCI on a PDCCH or an EPDCCH and sent to the user equipment.

With reference to any one of the third aspect or the first to the eighth possible implementations of the third aspect, in a tenth possible implementation, the instruction information is carried in UE-specific DCI on a PDCCH or an EPDCCH and sent to the user equipment.

With reference to any one of the third aspect or the first to the eighth possible implementations of the third aspect, in an eleventh possible implementation, the instruction information is sent to the user equipment by using higher layer signaling.

A fourth aspect of the embodiments of the present invention provides a base station, including: a sending module, configured to send instruction information to user equipment, where the instruction information is used to instruct the user equipment to start to detect a signal on an unlicensed spectrum channel.

In a first possible implementation of the fourth aspect, the base station further includes: a detection module, configured to determine that a random backoff number obtained during extended clear channel assessment ECCA detection is less than or equal to a first preset threshold.

In a second possible implementation of the fourth aspect, the base station further includes: a detection module, configured to determine that a random backoff number obtained during extended clear channel assessment ECCA detection is greater than or equal to a second preset threshold.

In a third possible implementation of the fourth aspect, the base station further includes: a detection module, configured to determine to schedule the user equipment on the unlicensed spectrum channel.

In a fourth possible implementation of the fourth aspect, the base station further includes: a detection module, configured to determine to send downlink data on the unlicensed spectrum channel.

With reference to either of the first or the second possible implementation of the fourth aspect, the instruction information includes the random backoff number, and the instruction information is used to instruct the user equipment to detect the signal on the unlicensed spectrum channel according to the random backoff number.

With reference to any one of the fourth aspect or the first to the fourth possible implementations of the fourth aspect, in a sixth possible implementation, the instruction information includes a detection start moment, and the instruction information is used to instruct the user equipment to detect the signal on the unlicensed spectrum channel according to the detection start moment.

With reference to any one of the fourth aspect or the first to the fourth possible implementations of the fourth aspect, in a seventh possible implementation, the instruction information includes a first time interval, and the first time interval is used to instruct the user equipment to detect the signal on the unlicensed spectrum channel after the first time interval.

With reference to any one of the fourth aspect or the first to the fourth possible implementations of the fourth aspect, in an eighth possible implementation, the instruction information includes a second time interval, and the second time interval is used to instruct the user equipment to detect the signal on the unlicensed spectrum channel within the second time interval.

With reference to any one of the fourth aspect or the first to the eighth possible implementations of the fourth aspect, in a ninth possible implementation, the instruction information is carried in public DCI on a PDCCH or an EPDCCH and sent to the user equipment.

With reference to any one of the fourth aspect or the first to the eighth possible implementations of the fourth aspect, in a tenth possible implementation, the instruction information is carried in UE-specific DCI on a PDCCH or an EPDCCH and sent to the user equipment.

With reference to any one of the fourth aspect or the first to the eighth possible implementations of the fourth aspect, in an eleventh possible implementation, the instruction information is sent to the user equipment by using higher layer signaling.

A fifth aspect of the embodiments of the present invention provides a method for detecting a signal on an unlicensed spectrum channel, including: receiving, by user equipment, instruction information sent by a base station; and stopping detecting, by the user equipment, a signal on an unlicensed spectrum channel according to the instruction information.

In a first possible implementation of the fifth aspect, the instruction information includes a detection stop moment; and the stopping detecting, by the user equipment, a signal on an unlicensed spectrum channel according to the instruction information includes: stopping detecting, by the user equipment, the signal on the unlicensed spectrum channel according to the detection stop moment.

In a second possible implementation of the fifth aspect, the instruction information includes a first time interval; and the stopping detecting, by the user equipment, a signal on an unlicensed spectrum channel according to the instruction information includes: stopping detecting, by the user equipment, the signal on the unlicensed spectrum channel after the first time interval.

In a third possible implementation of the fifth aspect, the instruction information includes a second time interval; and the stopping detecting, by the user equipment, a signal on an unlicensed spectrum channel according to the instruction information includes: stopping detecting, by the user equipment, the signal on the unlicensed spectrum channel within the second time interval.

With reference to any one of the fifth aspect or the first to the fourth possible implementations of the fifth aspect, in a fourth possible implementation, the user equipment receives the instruction information by using public DCI on a PDCCH or an EPDCCH.

With reference to any one of the fifth aspect or the first to the fourth possible implementations of the fifth aspect, in a fifth possible implementation, the user equipment receives the instruction information by using UE-specific DCI on a PDCCH or an EPDCCH.

With reference to any one of the fifth aspect or the first to the fourth possible implementations of the fifth aspect, in a sixth possible implementation, the user equipment receives the instruction information by using higher layer signaling.

A sixth aspect of the embodiments of the present invention provides user equipment, including: a receiving module, configured to receive instruction information sent by a base station; and a processing module, configured to stop detecting a signal on an unlicensed spectrum channel according to the instruction information.

In a first possible implementation of the sixth aspect, the instruction information includes a detection stop moment; and the processing module is configured to: stop detecting the signal on the unlicensed spectrum channel according to the detection stop moment.

In a second possible implementation of the sixth aspect, the instruction information includes a first time interval; and the processing module is configured to: stop detecting the signal on the unlicensed spectrum channel after the first time interval.

In a third possible implementation of the sixth aspect, the instruction information includes a second time interval; and the processing module is configured to: stop detecting the signal on the unlicensed spectrum channel within the second time interval.

With reference to any one of the sixth aspect or the first to the fourth possible implementations of the sixth aspect, in a fourth possible implementation, the receiving module receives the instruction information by using public DCI on a PDCCH or an EPDCCH.

With reference to any one of the sixth aspect or the first to the fourth possible implementations of the sixth aspect, in a fifth possible implementation, the receiving module receives the instruction information by using UE-specific DCI on a PDCCH or an EPDCCH.

With reference to any one of the sixth aspect or the first to the fourth possible implementations of the sixth aspect, in a sixth possible implementation, the receiving module receives the instruction information by using higher layer signaling.

A seventh aspect of the embodiments of the present invention provides a method for detecting a signal on an unlicensed spectrum channel, including: sending, by a base station, instruction information to user equipment, where the instruction information is used to instruct the user equipment to stop detecting a signal on an unlicensed spectrum channel.

In a first possible implementation of the seventh aspect, the method further includes: determining, by the base station, not to schedule the user equipment on the unlicensed spectrum channel.

In a second possible implementation of the seventh aspect, the method further includes: determining, by the base station, to receive uplink data on the unlicensed spectrum channel.

With reference to any one of the seventh aspect or the first or the second possible implementation of the seventh aspect, in a third possible implementation, the instruction information includes a detection stop moment, and the instruction information is used to instruct the user equipment to stop detecting the signal on the unlicensed spectrum channel according to the detection stop moment.

With reference to any one of the seventh aspect or the first or the second possible implementation of the seventh aspect, in a fourth possible implementation, the instruction information includes a first time interval, and the instruction information is used to instruct the user equipment to stop detecting the signal on the unlicensed spectrum channel after the first time interval.

With reference to any one of the seventh aspect or the first or the second possible implementation of the seventh aspect, in a fifth possible implementation, the instruction information includes a second time interval, and the instruction information is used to instruct the user equipment to stop detecting the signal on the unlicensed spectrum channel within the second time interval.

With reference to any one of the seventh aspect or the first to the fifth possible implementations of the seventh aspect, in a sixth possible implementation, the instruction information is carried in public DCI on a PDCCH or an EPDCCH and sent to the user equipment.

With reference to any one of the seventh aspect or the first to the fifth possible implementations of the seventh aspect, in an eighth possible implementation, the instruction information is carried in UE-specific DCI on a PDCCH or an EPDCCH and sent to the user equipment.

With reference to any one of the seventh aspect or the first to the fifth possible implementations of the seventh aspect, in a ninth possible implementation, the instruction information is sent to the user equipment by using higher layer signaling.

An eighth aspect of the embodiments of the present invention provides a base station, including: a sending module, configured to send instruction information to user equipment, where the instruction information is used to instruct the user equipment to stop detecting a signal on an unlicensed spectrum channel.

In a first possible implementation of the eighth aspect, the base station further includes: a detection module, configured to determine not to schedule the user equipment on the unlicensed spectrum channel.

In a second possible implementation of the eighth aspect, the base station further includes: a detection module, configured to determine to receive uplink data on the unlicensed spectrum channel.

With reference to any one of the eighth aspect or the first or the second possible implementation of the eighth aspect, in a third possible implementation, the instruction information includes a detection stop moment, and the instruction information is used to instruct the user equipment to stop detecting the signal on the unlicensed spectrum channel according to the detection stop moment.

With reference to any one of the eighth aspect or the first or the second possible implementation of the eighth aspect, in a fourth possible implementation, the instruction information includes a first time interval, and the instruction information is used to instruct the user equipment to stop detecting the signal on the unlicensed spectrum channel after the first time interval.

With reference to any one of the eighth aspect or the first or the second possible implementation of the eighth aspect, in a fifth possible implementation, the instruction information includes a second time interval, and the instruction information is used to instruct the user equipment to stop detecting the signal on the unlicensed spectrum channel within the second time interval.

With reference to any one of the eighth aspect or the first to the fifth possible implementations of the eighth aspect, in a sixth possible implementation, the instruction information is carried in public DCI on a PDCCH or an EPDCCH and sent to the user equipment.

With reference to any one of the eighth aspect or the first to the fifth possible implementations of the eighth aspect, in an eighth possible implementation, the instruction information is carried in UE-specific DCI on a PDCCH or an EPDCCH and sent to the user equipment.

With reference to any one of the eighth aspect or the first to the fifth possible implementations of the eighth aspect, in a ninth possible implementation, the instruction information is sent to the user equipment by using higher layer signaling.

A ninth aspect of the present invention provides user equipment, and the user equipment includes a network interface, a memory, and a processor, where the memory stores a set of programs, and the processor is configured to invoke the programs stored in the memory, so that the user equipment performs some or all of the steps in the method for detecting a signal on an unlicensed spectrum channel provided in the first aspect or the fifth aspect.

A tenth aspect of the present invention provides a base station, and the base station includes a network interface, a memory, and a processor, where the memory stores a set of programs, and the processor is configured to invoke the programs stored in the memory, so that the user equipment performs some or all of the steps in the method for detecting a signal on an unlicensed spectrum channel provided in the third aspect or the seventh aspect.

An eleventh aspect of the present invention provides a computer storage medium, and the computer storage medium stores a program, where when a computer executes the program, some or all of the steps in the method for detecting a signal on an unlicensed spectrum channel provided in the first aspect or the fifth aspect are performed.

A twelfth aspect of the present invention provides a computer storage medium, and the computer storage medium stores a program, where when a computer executes the program, some or all of the steps in the method for detecting a signal on an unlicensed spectrum channel provided in the third aspect or the seventh aspect are performed.

The embodiments of the present invention have the following beneficial effects:

A base station sends instruction information to user equipment, so that only when receiving the instruction information sent by the base station, the user equipment detects a signal on an unlicensed spectrum channel according to the instruction information. This reduces power consumption of the user equipment compared with the prior art in which user equipment detects a signal on an unlicensed spectrum channel in a blind detection manner.

BRIEF DESCRIPTION OF THE DRAWINGS

To describe embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
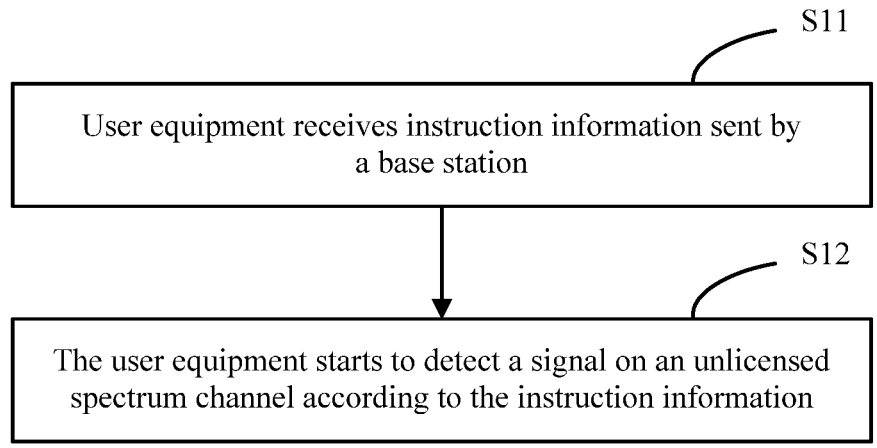
FIG. 1 is a schematic flowchart of a method for detecting a signal on an unlicensed spectrum channel according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

This section first describes some basic concepts in each embodiment of the present invention.

User equipment (UE) provided in an embodiment of the present invention includes a terminal, a mobile station (MS), a mobile terminal, or the like. The user equipment may communicate with one or more core networks by using a radio access network (RAN). For example, the user equipment may be a mobile phone (or referred to as a "cellular" phone), or a computer that has a mobile terminal. For example, the user equipment may further be a portable, pocket-sized, handheld, computer built-in, or in-vehicle mobile apparatus, which exchanges voice and/or data with the radio access network. A base station provided in an embodiment of the present invention may be an evolved NodeB (eNB or e-NodeB) in an LTE system or an LAA-LTE system, a macro base station, a micro base station (also referred to as a "small cell"), a pico base station, an access point (AP), a transmission point (TP), or the like. The present invention sets no limitation thereto. For ease of description, however, the following embodiments are described by using the base station and the user equipment as examples.

It should be understood that a communications system in which the base station and the user equipment mentioned in the embodiments of the present invention are located is a communications system with a predefined or fixed subframe start moment, a subframe end moment, a timeslot start moment, a timeslot end moment, a symbol start moment, and a symbol end moment. In such a communications system, time is divided in a fixed time unit. That is, when a time unit granularity and a start moment and an end moment of a time unit are determined, start moments and end moments of a past time unit and a future time unit can be known.

It should be understood that in the embodiments of the present invention, in a particular area, a subframe start moment, a subframe end moment, and a subframe boundary of a signal transmitted on an unlicensed spectrum channel are aligned with a subframe start moment, a subframe end moment, and a subframe boundary of a signal transmitted on a licensed spectrum channel in a communications system, such as an LAA-LTE system, operated by a same operator.

It should be understood that in the technical solutions in the embodiments of the present invention, a symbol may be an orthogonal frequency division multiplexing (OFDM) symbol in the LAA-LTE system or the LTE system. In the LAA-LTE system or the LTE system, a length of one subframe is 1 ms. One subframe in a normal cyclic prefix (NCP) subframe format includes 14 OFDM symbols numbered from 0 to 13, where #0 to #6 are a first timeslot, and #7 to #13 are a second timeslot. One subframe in an extended cyclic prefix (ECP) subframe format includes 12 OFDM symbols numbered from 0 to 11, where #0 to #5 are a first timeslot, and #6 to #11 are a second timeslot.

When an unlicensed spectrum resource is used for communication in the LTE system, the LAA-LTE system, and an Unlicensed Long Term Evolution (U-LTE) system, friendly coexistence with an existing communications system that uses the unlicensed spectrum resource for communication needs to be considered. To achieve this objective, an LBT channel access mechanism is introduced in some countries and regions, such as Europe and Japan. In accordance with a provision of a European regulation, the LBT mechanism is classified into an LBT mechanism for FBE and an LBT mechanism for LBE. The two channel access mechanisms specified in the provision of the European regulation are briefly described as follows:

A characteristic of the LBT mechanism for FBE is as follows: Before transmitting data on an operating channel, a device needs to perform CCA detection on the channel in an energy detection manner within a period of time starting from a fixed moment. The period of time cannot be less than 20 µs, and may be usually referred to as a CCA timeslot (CCA slot). If the device determines that the channel is clear in the CCA timeslot by means of CCA detection, the device can start, at a predefined moment, to send a signal in a fixed frame period format. If the device determines, by means of CCA detection, that the channel is occupied in the CCA timeslot, the device can only wait for a next fixed moment to start CCA detection again.

A characteristic of the LBT mechanism for LBE is as follows: Before transmitting data on an operating channel, a device may perform CCA detection on the channel in an energy detection manner within a period of time starting from an arbitrary moment. The period of time cannot be less than 20 µs, and may be usually referred to as a CCA timeslot (CCA slot). During initial access, the device can transmit a signal on the channel after determining, by means of CCA detection, that the channel is clear in one CCA timeslot. Once the device detects that the channel is occupied, or a transmission time of the device on the channel reaches a maximum transmission time allowed in the system, the device needs to perform extended clear channel assessment ECCA (Extended CCA) detection. Each time before executing ECCA detection, the device needs to generate a random integer N and save it in a counter. N is a number randomly selected from 1 to q, N may be considered as a backoff length, and q may be considered as a length of a contention window. An ECCA detection procedure is also a backoff procedure. Therefore, the contention window is also referred to as a backoff window. The device determines whether the channel is clear in one CCA timeslot by executing CCA detection once. If the channel is clear, a value of N in the counter is decreased by 1; or if it is detected that the channel is busy, a value of N in the counter remains unchanged. When the value of N in the counter is decreased to 0, the device can start data transmission.

Referring to FIG. 1, FIG. 1 is a schematic flowchart of a method for detecting a signal on an unlicensed spectrum channel according to an embodiment of the present invention. This embodiment of the present invention is described from a perspective of user equipment. The method shown in FIG. 1 may include the following steps.

Step S11: The user equipment receives instruction information sent by a base station.

In an optional implementation, the instruction information includes a random backoff number. It should be understood that if the base station follows a backoff procedure of ECCA detection when accessing an unlicensed spectrum channel, the base station needs to generate a random backoff number N and save it in a counter each time before executing ECCA detection. The base station determines whether the channel is clear in one CCA timeslot by executing CCA detection once. If the channel is clear, a value of N in the counter is decreased by 1; or if it is detected that the channel is busy, a value of N in the counter remains unchanged. Therefore, the value of N changes with a channel detection status. The random backoff number may be an initial value of N used by the base station during ECCA detection. For example, the random backoff number N generated by the base station before performing ECCA detection is 50; in this case, the random backoff number is 50. Alternatively, the random backoff number may be a value of N used by the base station during ECCA detection. For example, the random backoff number N generated by the base station before performing ECCA detection is 50, and the value of N in the counter decreases from 50 to 45 after channel detection is performed for a period of time and it is determined that the channel is clear in five CCA timeslots; in this case, the random backoff number may be 45.

In another optional implementation, the instruction information includes a detection start moment, and the user equipment starts to detect the signal on the unlicensed spectrum channel according to the detection start moment. It should be understood that the detection start moment may be a start moment of a subframe, a start moment of a timeslot, or a start moment of a symbol.

In still another optional implementation, the instruction information includes a first time interval, and the user equipment starts to detect the signal on the unlicensed spectrum channel after the first time interval. It should be understood that the first time interval may be a time interval of one or more contiguous subframes, a time interval of one or more contiguous timeslots, or a time interval of one or more contiguous symbols.

In still another optional implementation, the instruction information includes a second time interval, and the user equipment starts to detect the signal on the unlicensed spectrum channel within the second time interval. It should be understood that the second time interval may be a time interval of one or more contiguous subframes, a time interval of one or more contiguous timeslots, or a time interval of one or more contiguous symbols.

Optionally, the user equipment may receive the instruction information in public DCI on a physical downlink control channel PDCCH or an enhanced physical downlink control channel EPDCCH; or the user equipment receives the instruction information over a broadcast channel. That is, the base station notifies multiple user equipments in a collective notification manner to reduce signaling overheads.

Optionally, the user equipment may receive the instruction information in UE-specific DCI on a physical downlink control channel PDCCH or an enhanced physical downlink control channel EPDCCH. That is, the base station notifies user equipments one by one, so that the user equipments start to detect a signal on an unlicensed spectrum according to the instruction information, so as to reduce power consumption of the user equipments.

Optionally, the user equipment may receive the instruction information by using higher layer signaling (for example, radio resource control RRC signaling). Further, the user equipment may receive the instruction information by using a public higher layer signaling instruction; or the user equipment may receive the instruction information by using a UE-specific higher layer signaling instruction.

Further optionally, the user equipment may receive the instruction information by using a PDCCH, an EPDCCH, a broadcast channel, or higher layer signaling on a licensed spectrum channel. Alternatively, the user equipment may receive the instruction information by using a PDCCH, an EPDCCH, a broadcast channel, or higher layer signaling on another unlicensed spectrum channel. That is, the user equipment is communicating with the base station over the another unlicensed spectrum channel, and if the base station sends the instruction information over the another unlicensed spectrum channel, the user equipment may also detect the instruction information.

Step S12: The user equipment starts to detect a signal on an unlicensed spectrum channel according to the instruction information.

In an optional implementation, the instruction information includes a random backoff number, and the user equipment determines, according to the random backoff number, a first moment when the base station obtains permission to use the unlicensed spectrum channel, and detects the signal on the unlicensed spectrum channel according to the first moment. It should be understood that the first moment determined by the user equipment according to the random backoff number may be an earliest moment when the base station can obtain the permission to use the unlicensed spectrum channel, and the base station may access the unlicensed spectrum channel at the first moment. Therefore, the user equipment may detect the signal on the unlicensed spectrum channel according to the first moment.

In specific implementation, the user equipment may determine, according to the random backoff number and a length of a CCA timeslot, the first moment when the base station obtains the permission to use the unlicensed spectrum channel, and detect the signal on the unlicensed spectrum channel according to a predefined signal location at the first moment or a second moment before the first moment.

A time interval between the first moment and the second moment equals a third preset threshold. The CCA timeslot is a predefined length unit of CCA detection, and the base station and the user equipment may constrain the CCA timeslot in advance to keep consistency. The predefined signal location is a location at which the base station may start to transmit a signal, and the location is preset in a subframe. For example, symbol #0, #3, #7, or #10 in the subframe is set as a possible signal start location. The user equipment detects the signal on the unlicensed spectrum channel according to the predefined signal start location, until the signal on the unlicensed spectrum channel is detected. It should be understood that the predefined signal start location may be a start location of a PDSCH signal at a beginning of transmission, a start location of a PDCCH/an EPDCCH, or a start location of a preamble sequence.

It is assumed that the random backoff number is 100, the CCA timeslot is 20 μs, and the predefined signal start location is symbol #4, #7, or #11. The user equipment receives the random backoff number in subframe #0. The user equipment determines, according to the random backoff number and the CCA timeslot, that the base station can access the unlicensed spectrum channel after at least 2 ms, and further determines that the first moment when the base station obtains the permission to use the unlicensed spectrum channel is a start moment of subframe #2. The user equipment may start, in symbol #4 of subframe #2, to detect whether the signal on the unlicensed spectrum channel exists; if the signal does not exist, the user equipment continues to detect whether the signal on the unlicensed spectrum channel exists in symbol #7, and so on.

In another optional implementation, the instruction information includes a random backoff number. The user equipment determines whether the random backoff number is less than or equal to K; if yes, the user equipment detects the signal on the unlicensed spectrum channel according to the predefined signal location, where K is a fourth preset threshold.

It is assumed that K is 10. When the random backoff number in the instruction information received by the user equipment is less than or equal to 10, the user equipment detects the signal on the unlicensed spectrum channel according to the predefined signal location.

In still another optional implementation, the instruction information includes a detection start moment, and the user equipment detects the signal on the unlicensed spectrum channel according to the detection start moment.

In specific implementation, the detection start moment may be a start moment of a subframe, a start moment of a timeslot, or a start moment of a symbol. The detection start moment may instruct to start detecting the signal on the unlicensed spectrum channel in a current subframe, the $M^{th}$ subframe following the current subframe, or the $N^{th}$ symbol following a current symbol, where M is equal to a fifth preset threshold, and N is equal to a sixth preset threshold.

The user equipment may detect the signal on the unlicensed spectrum channel in the current subframe according to the predefined signal location. That is, when receiving the instruction information, the user equipment starts to detect the signal on the unlicensed spectrum channel. It is assumed that the predefined signal location is symbol #0, #3, #7, or #10, and a subframe in which the user equipment receives the instruction information is subframe #0. In this case, the user equipment may detect whether the signal on the unlicensed spectrum channel exists in symbol #0 of subframe #0; if the signal does not exist, the user equipment continues to detect whether the signal on the unlicensed spectrum channel exists in symbol #3, and so on.

The user equipment may detect, according to the predefined signal location, the signal on the unlicensed spectrum channel in the $M^{th}$ subframe following the current subframe. It is assumed that a subframe in which the user equipment receives the instruction information is subframe #0, M is 2, and the predefined signal location is symbol #0, #3, #7, or #10. In this case, the user equipment may detect whether the signal on the unlicensed spectrum channel exists in symbol #0 of subframe #2; if the signal does not exist, the user equipment continues to detect whether the signal on the unlicensed spectrum channel exists in symbol #3, and so on.

The user equipment may detect the signal on the unlicensed spectrum channel in the $N^{th}$ symbol following the current symbol. It is assumed that a symbol in which the user equipment receives the instruction information is symbol #0 of subframe #0, and N is 2. In this case, the user equipment may start, in symbol #2 of subframe #0, to detect whether the signal on the unlicensed spectrum channel exists; if the signal does not exist, the user equipment detects whether the signal on the unlicensed spectrum channel exists in symbol #3; if the signal does not exist, the user equipment detects whether the signal on the unlicensed spectrum channel exists in symbol #4, and so on.

Optionally, the user equipment may start, in the $N^{th}$ symbol following the current symbol, to detect the signal on the unlicensed spectrum channel according to the predefined signal location. It is assumed that a symbol in which the user equipment receives the instruction information is symbol #0 of subframe #0, N is 2, and the predefined signal location is symbol #0, #3, #7, or #10. In this case, the user equipment may start, in symbol #3 of subframe #0, to detect whether the signal on the unlicensed spectrum channel exists; if the signal does not exist, the user equipment detects whether the signal on the unlicensed spectrum channel exists in symbol #7 of subframe #0, and so on.

In still another optional implementation, the instruction information includes a first time interval, and the user equipment may detect the signal on the unlicensed spectrum channel after the first time interval.

It is assumed that the first time interval is 2 ms. The user equipment may start to detect the signal on the unlicensed spectrum channel 2 ms after receiving the instruction information.

In still another optional implementation, the instruction information includes a second time interval, and the user equipment detects the signal on the unlicensed spectrum channel within the second time interval.

It is assumed that the second time interval is 3 ms. The user equipment may start to detect the signal on the unlicensed spectrum channel within 3 ms after receiving the instruction information.

Further, the instruction information may carry identifier information of the user equipment. When receiving the instruction information, the user equipment first detects whether its identifier information is included in the instruction information; if a detection result is yes, the user equipment detects the signal on the unlicensed spectrum channel according to the instruction information, where the identifier information of the user equipment may be a UE ID of the user equipment, a cell ID of the user equipment, or the like.

Further, the instruction information may carry identifier information of the unlicensed spectrum channel. When receiving the instruction information, the user equipment detects the unlicensed spectrum channel indicated by the identifier information of the unlicensed spectrum channel. For example, the base station predefines four unlicensed spectrum channels: A, B, C, and D, and the instruction information carries identifier information of unlicensed spectrum channel D. In this case, the user equipment detects a signal on unlicensed spectrum channel D according to the instruction information.

Optionally, the instruction information further carries time indication information. When the user equipment detects that a period of time during which the base station occupies the unlicensed spectrum channel reaches a period of time indicated by the time indication information, the user equipment may stop detecting the signal on the unlicensed spectrum channel.

In the embodiment shown in FIG. 1, only when receiving instruction information sent by a base station, user equipment detects a signal on an unlicensed spectrum channel according to the instruction information. This reduces power consumption of the user equipment compared with the prior art in which user equipment detects a signal on an unlicensed spectrum channel in a blind detection manner.

Figure 2:
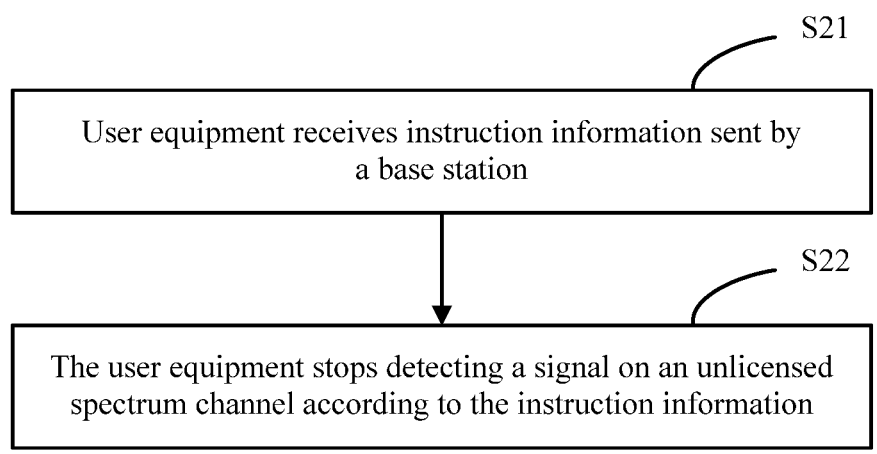
FIG. 2 is a schematic flowchart of another method for detecting a signal on an unlicensed spectrum channel according to an embodiment of the present invention.

Referring to FIG. 2, FIG. 2 is a schematic flowchart of another method for detecting a signal on an unlicensed spectrum channel according to an embodiment of the present invention. This embodiment of the present invention is described from a perspective of user equipment. The method shown in FIG. 2 may include the following steps.

Step S21: The user equipment receives instruction information sent by a base station.

In an optional implementation, the instruction information includes a random backoff number. It should be understood that if the base station follows a backoff procedure of ECCA detection when accessing an unlicensed spectrum channel, the base station needs to generate a random backoff number N and save it in a counter each time before executing ECCA detection. The base station determines whether the channel is clear in one CCA timeslot by executing CCA detection once. If the channel is clear, a value of N in the counter is decreased by 1; or if it is detected that the channel is busy, a value of N in the counter remains unchanged. Therefore, the value of N changes with a channel detection status. The random backoff number may be an initial value of N used by the base station during ECCA detection. For example, the random backoff number N generated by the base station before performing ECCA detection is 50; in this case, the random backoff number is 50. Alternatively, the random backoff number may be a value of N used by the base station during ECCA detection. For example, the random backoff number N generated by the base station before performing ECCA detection is 50, and the value of N in the counter decreases from 50 to 45 after channel detection is performed for a period of time and it is determined that the channel is clear in five CCA timeslots; in this case, the random backoff number may be 45.

In another optional implementation, the instruction information includes a detection stop moment, and the user equipment stops detecting the signal on the unlicensed spectrum channel according to the detection stop moment. It should be understood that the detection stop moment may be an end moment of a subframe, an end moment of a timeslot, or an end moment of a symbol.

In still another optional implementation, the instruction information includes a first time interval, and the user equipment stops detecting the signal on the unlicensed spectrum channel after the first time interval. It should be understood that the first time interval may be a time interval of one or more contiguous subframes, a time interval of one or more contiguous timeslots, or a time interval of one or more contiguous symbols.

In still another optional implementation, the instruction information includes a second time interval, and the user equipment stops detecting the signal on the unlicensed spectrum channel within the second time interval. It should be understood that the second time interval may be a time interval of one or more contiguous subframes, a time interval of one or more contiguous timeslots, or a time interval of one or more contiguous symbols.

Optionally, the user equipment may receive the instruction information in public DCI on a physical downlink control channel PDCCH or an enhanced physical downlink control channel EPDCCH; or the user equipment receives the instruction information over a broadcast channel. That is, the base station notifies multiple user equipments in a collective notification manner to reduce signaling overheads.

Optionally, the user equipment may receive the instruction information in UE-specific DCI on a physical downlink control channel PDCCH or an enhanced physical downlink control channel EPDCCH. That is, the base station notifies user equipments one by one, so that the notified user equipments stop detecting a signal on an unlicensed spectrum according to the instruction information, so as to reduce power consumption of the user equipments.

Optionally, the user equipment may receive the instruction information by using higher layer signaling (for example, radio resource control RRC signaling). Further, the user equipment may receive the instruction information by using a public higher layer signaling instruction; or the user equipment may receive the instruction information by using a UE-specific higher layer signaling instruction.

Further optionally, the user equipment may receive the instruction information by using a PDCCH, an EPDCCH, a broadcast channel, or higher layer signaling on a licensed spectrum channel. Alternatively, the user equipment may receive the instruction information by using a PDCCH, an EPDCCH, a broadcast channel, or higher layer signaling on an unlicensed spectrum channel being used or another unlicensed spectrum channel. That is, the user equipment is communicating with the base station over either of the unlicensed spectrum channel being used or the another unlicensed spectrum channel, and if the base station sends the instruction information over either of the unlicensed spectrum channel being used or the another unlicensed spectrum channel, the user equipment may also detect the instruction information.

Step S22: The user equipment stops detecting a signal on an unlicensed spectrum channel according to the instruction information.

In an optional implementation, the instruction information includes a random backoff number, and the user equipment determines, according to the random backoff number, a first moment when the base station obtains permission to use the unlicensed spectrum channel, and stops detecting the signal on the unlicensed spectrum channel according to the first moment. It should be understood that the first moment determined by the user equipment according to the random backoff number may be an earliest moment when the base station can obtain the permission to use the unlicensed spectrum channel, and the base station may access the unlicensed spectrum channel at the first moment. Therefore, the user equipment may stop detecting the signal on the unlicensed spectrum channel according to the first moment.

In specific implementation, the user equipment may determine, according to the random backoff number and a length of a CCA timeslot, the first moment when the base station obtains the permission to use the unlicensed spectrum channel, and stop detecting the signal on the unlicensed spectrum channel at the first moment or a second moment before the first moment.

A time interval between the first moment and the second moment equals a third preset threshold. The CCA timeslot is a predefined length unit of CCA detection, and the base station and the user equipment may constrain the CCA timeslot in advance to keep consistency.

It is assumed that the random backoff number is 100, and the CCA timeslot is 20 μs. The user equipment receives the random backoff number in subframe #0. The user equipment determines, according to the random backoff number and the CCA timeslot, that the base station can access the unlicensed spectrum channel after at least 2 ms, and further determines that the first moment when the base station obtains the permission to use the unlicensed spectrum channel is a start moment of subframe #2. The user equipment may stop detecting the signal on the unlicensed spectrum channel within a period of time from a start moment of subframe #0 to the start moment of subframe #2.

In another optional implementation, the instruction information includes a random backoff number. The user equipment determines whether the random backoff number is greater than or equal to K; if yes, the user equipment stops detecting the signal on the unlicensed spectrum channel in a current subframe, the $P^{th}$ subframe following the current subframe, or the $Q^{th}$ symbol following a current symbol, where K is a fourth preset threshold, P is a seventh preset threshold, and Q is an eighth preset threshold.

It is assumed that K is 100. When the random backoff number in the instruction information received by the user equipment is greater than or equal to 100, the user equipment stops detecting the signal on the unlicensed spectrum channel within a predefined period of time. The predefined period of time may be a current subframe in which the instruction information is received, may start from the current frame and end with the $P^{th}$ subframe following the current subframe, or may start from a current symbol in which the instruction information is received and end with the $Q^{th}$ symbol following the current symbol.

In another optional implementation, the instruction information includes a detection stop moment, and the user equipment stops detecting the signal on the unlicensed spectrum channel according to the detection stop moment.

In specific implementation, the detection stop moment may be an end moment of a subframe, an end moment of a timeslot, or an end moment of a symbol. The detection stop moment may instruct to stop detecting the signal on the unlicensed spectrum channel in a current subframe, the $M^{th}$ subframe following the current subframe, or the $N^{th}$ symbol following a current symbol, where M is equal to a fifth preset threshold, and N is equal to a sixth preset threshold.

The user equipment may stop detecting the signal on the unlicensed spectrum channel at an end moment of the current subframe in which the instruction information is received.

The user equipment may stop detecting the signal on the unlicensed spectrum channel at an end moment of the $M^{th}$ subframe following the current subframe in which the instruction information is received.

The user equipment may stop detecting the signal on the unlicensed spectrum channel at an end moment of the $N^{th}$ symbol following the current symbol in which the instruction information is received.

In still another optional implementation, the instruction information includes a first time interval, and the user equipment may stop detecting the signal on the unlicensed spectrum channel after the first time interval.

It is assumed that the first time interval is 2 ms. The user equipment may stop detecting the signal on the unlicensed spectrum channel 2 ms after receiving the instruction information.

In still another optional implementation, the instruction information includes a second time interval, and the user equipment stops detecting the signal on the unlicensed spectrum channel within the second time interval.

It is assumed that the second time interval is 3 ms. The user equipment may stop detecting the signal on the unlicensed spectrum channel within 3 ms after receiving the instruction information.

Further, the instruction information may carry identifier information of the user equipment. When receiving the instruction information, the user equipment first detects whether its identifier information is included in the instruction information; if a detection result is yes, the user equipment stops detecting the signal on the unlicensed spectrum channel according to the instruction information, where the identifier information of the user equipment may be a UE ID of the user equipment, a cell ID of the user equipment, or the like.

Further, the instruction information may carry identifier information of the unlicensed spectrum channel. When receiving the instruction information, the user equipment stops detecting the unlicensed spectrum channel indicated by the identifier information of the unlicensed spectrum channel. For example, the base station predefines four unlicensed spectrum channels: A, B, C, and D, and the instruction information carries identifier information of unlicensed spectrum channel D. In this case, the user equipment stops detecting a signal on unlicensed spectrum channel D according to the instruction information.

In the embodiment shown in FIG. 2, when receiving instruction information sent by a base station, user equipment may stop detecting a signal on an unlicensed spectrum channel according to the instruction information. This reduces power consumption of the user equipment compared with the prior art in which user equipment always detects a signal on an unlicensed spectrum channel.

It should be noted that the foregoing two procedures may coexist in a same embodiment, or one of the procedures is adopted together with the prior art in an embodiment. This is not limited in the embodiments of the present invention.

Figure 3:
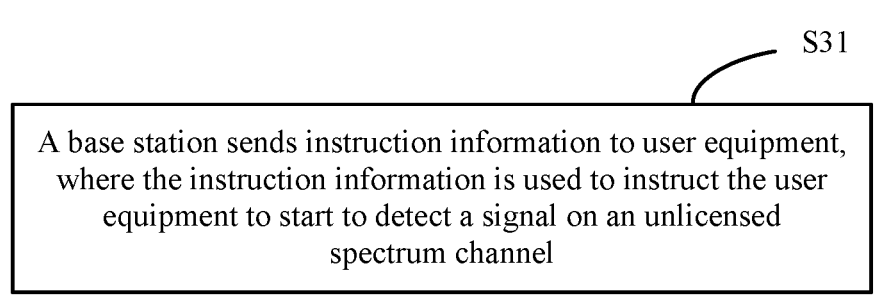
FIG. 3 is a schematic flowchart of still another method for detecting a signal on an unlicensed spectrum channel according to an embodiment of the present invention.

Referring to FIG. 3, FIG. 3 is a schematic flowchart of still another method for detecting a signal on an unlicensed spectrum channel according to an embodiment of the present invention. This embodiment of the present invention is described from a perspective of a base station. The method shown in FIG. 3 may include the following step.

Step S31: The base station sends instruction information to user equipment, where the instruction information is used to instruct the user equipment to start to detect a signal on an unlicensed spectrum channel.

It should be understood that if the base station follows a backoff procedure of ECCA detection when accessing the unlicensed spectrum channel, the base station needs to generate a random backoff number N and save it in a counter each time before executing ECCA detection. The base station determines whether the channel is clear in one CCA timeslot by executing CCA detection once. If the channel is clear, a value of N in the counter is decreased by 1; or if it is detected that the channel is busy, a value of N in the counter remains unchanged. Therefore, the value of N changes with a channel detection status. The random backoff number may be an initial value of N used by the base station during ECCA detection. For example, the random backoff number N generated by the base station before performing ECCA detection is 50; in this case, the random backoff number is 50. Alternatively, the random backoff number may be a value of N used by the base station during ECCA detection. For example, the random backoff number N generated by the base station before performing ECCA detection is 50, and the value of N in the counter decreases from 50 to 45 after channel detection is performed for a period of time and it is determined that the channel is clear in five CCA timeslots; in this case, the random backoff number may be 45.

In an optional implementation, if the base station determines that a random backoff number obtained during extended clear channel assessment ECCA detection is less than or equal to a first preset threshold, the base station sends the instruction information to the user equipment. If the first preset threshold is relatively small, it indicates that the base station can use the unlicensed spectrum channel after a short period of time. In this case, preferably, the instruction information sent by the base station to the user equipment may include a detection start moment, so that the user equipment detects the signal on the unlicensed spectrum channel in time according to the detection start moment.

In another optional implementation, if the base station determines that a random backoff number obtained during extended clear channel assessment ECCA detection is greater than or equal to a second preset threshold, the base station sends the instruction information to the user equipment. If the second preset threshold is relatively large, it indicates that the base station can use the unlicensed spectrum channel after a long period of time. In this case, preferably, the instruction information sent by the base station to the user equipment may include the random backoff number, so that the user equipment waits a period of time according to the random backoff number before detecting the signal on the unlicensed spectrum channel.

Optionally, the instruction information includes the random backoff number, and the instruction information is used to instruct the user equipment to detect the signal on the unlicensed spectrum channel according to the random backoff number.

In still another optional implementation, if the base station determines, after determining permission to use the unlicensed spectrum channel, to schedule the user equipment on the unlicensed spectrum channel, that is, if the base station needs to schedule one user equipment or some user equipments after determining the permission to use the unlicensed spectrum channel, the base station sends the instruction information to the user equipment or the user equipments. In this case, preferably, the instruction information sent by the base station to the user equipment may include a detection start moment, a first time interval, or a second time interval.

It should be understood that the base station may preset a location, at which a signal may start to be transmitted, in a subframe, for example, set symbol #0, #3, #7, or #10 in the subframe as a possible signal start location. In this case, the base station may start, at any predefined signal start location, to send a signal on the unlicensed spectrum channel.

In still another optional implementation, after the base station determines the permission to use the unlicensed spectrum channel, the base station may determine the detection start moment according to an uplink-downlink subframe configuration. For example, the uplink-downlink subframe configuration is ⅔. That is, the base station receives two uplink subframes each time it sends three downlink subframes, or the base station sends three downlink subframes each time it receives two uplink subframes. Optionally, the base station may instruct, by using the instruction information, the user equipment to start to perform detection at a start moment of each downlink subframe according to a predefined signal start location. Optionally, the base station may instruct, by using the instruction information, the user equipment to start to perform detection at a start moment of the first downlink subframe according to a predefined signal start location.

In still another optional implementation, if the base station determines, after determining permission to use the unlicensed spectrum channel, to send downlink data on the unlicensed spectrum channel, that is, after determining the permission to use the unlicensed spectrum channel, if the base station needs to instruct all user equipments or part of user equipments to detect the signal on the unlicensed spectrum channel, the base station sends the instruction information to the user equipments. In this case, preferably, the instruction information sent by the base station to the user equipments may include a detection start moment, a first time interval, or a second time interval.

In still another optional implementation, if the base station determines, according to system collision detection, transmission duration information of another device that occupies the unlicensed spectrum channel, the base station sends the instruction information to the user equipment. In this case, preferably, the instruction information sent by the base station to the user equipment may include a detection start moment, a first time interval, or a second time interval. Alternatively, if the base station determines, according to system collision detection, transmission duration information of another device that occupies the unlicensed spectrum channel and determines a random backoff number during extended clear channel assessment ECCA detection, the base station sends the instruction information to the user equipment. In this case, preferably, the instruction information sent by the base station to the user equipment may include the transmission duration information of the another device that occupies the unlicensed spectrum channel, a detection start moment, the random backoff number, a first time interval, or a second time interval.

The system collision detection means the following: When detecting a signal of a Wi-Fi system, an LAA-LTE system, or another system on the unlicensed spectrum channel, the base station or the user equipment obtains information about whether the base station collides with the Wi-Fi system, the LAA-LTE system, or the another system on the unlicensed spectrum channel. If a collision is detected, the base station may further obtain transmission duration information of another device that currently occupies the unlicensed spectrum channel.

Optionally, when the instruction information includes the detection start moment, the instruction information is used to instruct the user equipment to detect the signal on the unlicensed spectrum channel according to the detection start moment.

The detection start moment may instruct the user equipment to detect the signal on the unlicensed spectrum channel in a current subframe, the $M^{th}$ subframe following the current subframe, or the $N^{th}$ symbol following a current symbol, where M is equal to a fifth preset threshold, and N is equal to a sixth preset threshold.

Optionally, when the instruction information includes the first time interval, the first time interval is used to instruct the user equipment to detect the signal on the unlicensed spectrum channel after the first time interval.

Optionally, when the instruction information includes the second time interval, the second time interval is used to instruct the user equipment to detect the signal on the unlicensed spectrum channel within the second time interval.

Optionally, the instruction information may be carried in public DCI on a physical downlink control channel PDCCH or an enhanced physical downlink control channel EPDCCH and sent to the user equipment; or the instruction information may be sent to the user equipment over a broadcast channel. That is, the base station may notify multiple user equipments in a collective notification manner to reduce signaling overheads.

Optionally, the instruction information may be carried in UE-specific DCI on a physical downlink control channel PDCCH or an enhanced physical downlink control channel EPDCCH and sent to the user equipment. That is, the base station may notify user equipments one by one, so that the scheduled user equipments detect a signal on an unlicensed spectrum according to the instruction information, so as to reduce power consumption of the user equipments.

Optionally, the instruction information may be sent to the user equipment in a symbol preceding a beginning of the current subframe, the first symbol of the current subframe, or the first several symbols of the current subframe, so that the user equipment determines whether it needs to start to detect the signal on the unlicensed spectrum channel in the current subframe.

Optionally, the instruction information may be sent to the user equipment by using higher layer signaling.

Optionally, the instruction information may include a maximum random backoff number, and the maximum random backoff number may be determined by a length of a contention window. The instruction information is sent to the user equipment by using higher layer signaling. In this way, the user equipment determines by itself a time interval in which the base station cannot access the unlicensed spectrum channel, and further determines to start to detect the signal on the unlicensed spectrum channel after the time interval.

Optionally, the instruction information may be sent to the user equipment by using a PDCCH, an EPDCCH, a broadcast channel, or higher layer signaling on a licensed spectrum channel. The instruction information may be sent to the user equipment by using a PDCCH, an EPDCCH, a broadcast channel, or higher layer signaling on another unlicensed spectrum channel. That is, the user equipment is communicating with the base station over the another unlicensed spectrum channel, and if the base station sends the instruction information over the another unlicensed spectrum channel, the user equipment may also detect the instruction information.

Further, the instruction information may carry identifier information of the user equipment. When receiving the instruction information, the user equipment first detects whether its identifier information is included in the instruction information; if a detection result is yes, the user equipment detects the signal on the unlicensed spectrum channel according to the instruction information, where the identifier information of the user equipment may be a UE ID of the user equipment, a cell ID of the user equipment, or the like.

Further, the instruction information may carry identifier information of the unlicensed spectrum channel. In this way, when receiving the instruction information, the user equipment detects the unlicensed spectrum channel indicated by the identifier information of the unlicensed spectrum channel. For example, the base station predefines four unlicensed spectrum channels: A, B, C, and D, and the instruction information carries identifier information of unlicensed spectrum channel D. In this case, the user equipment detects a signal on unlicensed spectrum channel D according to the instruction information.

Optionally, the instruction information further carries time indication information. When the user equipment detects the signal on the unlicensed spectrum channel and detects that a period of time during which the base station occupies the unlicensed spectrum channel reaches a period of time indicated by the time indication information, the user equipment stops detecting the signal on the unlicensed spectrum channel.

In the embodiment shown in FIG. 3, a base station sends instruction information to user equipment, so that only when receiving the instruction information sent by the base station, the user equipment detects a signal on an unlicensed spectrum channel according to the instruction information. This reduces power consumption of the user equipment compared with the prior art in which user equipment detects a signal on an unlicensed spectrum channel in a blind detection manner.

Figure 4:
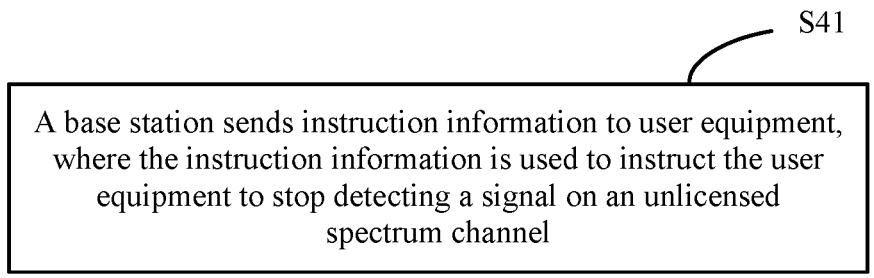
FIG. 4 is a schematic flowchart of still another method for detecting a signal on an unlicensed spectrum channel according to an embodiment of the present invention.

Referring to FIG. 4, FIG. 4 is a schematic flowchart of still another method for detecting a signal on an unlicensed spectrum channel according to an embodiment of the present invention. This embodiment of the present invention is described from a perspective of a base station. The method shown in FIG. 4 may include the following step.

Step S41: The base station sends instruction information to user equipment, where the instruction information is used to instruct the user equipment to stop detecting a signal on an unlicensed spectrum channel.

It should be understood that if the base station follows a backoff procedure of ECCA detection when accessing the unlicensed spectrum channel, the base station needs to generate a random backoff number N and save it in a counter each time before executing ECCA detection. The base station determines whether the channel is clear in one CCA timeslot by executing CCA detection once. If the channel is clear, a value of N in the counter is decreased by 1; or if it is detected that the channel is busy, a value of N in the counter remains unchanged. Therefore, the value of N changes with a channel detection status. The random backoff number may be an initial value of N used by the base station during ECCA detection. For example, the random backoff number N generated by the base station before performing ECCA detection is 50; in this case, the random backoff number is 50. Alternatively, the random backoff number may be a value of N used by the base station during ECCA detection. For example, the random backoff number N generated by the base station before performing ECCA detection is 50, and the value of N in the counter decreases from 50 to 45 after channel detection is performed for a period of time and it is determined that the channel is clear in five CCA timeslots; in this case, the random backoff number may be 45.

In an optional implementation, if the base station determines that a random backoff number obtained during extended clear channel assessment ECCA detection is greater than or equal to a second preset threshold, the base station sends the instruction information to the user equipment. If the second preset threshold is relatively large, it indicates that the base station can use the unlicensed spectrum channel after a long period of time. In this case, preferably, the instruction information sent by the base station to the user equipment may include the random backoff number, so that the user equipment determines, according to the random backoff number, to stop detecting the signal on the unlicensed spectrum channel within a period of time.

Optionally, the instruction information includes the random backoff number, and the instruction information is used to instruct the user equipment to stop detecting the signal on the unlicensed spectrum channel according to the random backoff number.

In another optional implementation, the base station determines not to schedule the user equipment on the unlicensed spectrum channel, and then the base station sends the instruction information to the user equipment, where the instruction information is used to instruct the user equipment to stop detecting the signal on the unlicensed spectrum channel. In this case, preferably, the instruction information sent by the base station to the user equipment may include a detection stop moment, a first time interval, or a second time interval, so that the user equipment stops detecting the signal on the unlicensed spectrum channel according to the instruction information.

For example, during ECCA detection, the base station detects that the unlicensed spectrum channel is occupied, and then may determine not to schedule the user equipment on the unlicensed spectrum channel.

In still another optional implementation, the base station determines to receive uplink data on the unlicensed spectrum channel, and then the base station sends the instruction information to the user equipment, where the instruction information is used to instruct the user equipment to stop detecting the signal on the unlicensed spectrum channel. In this case, preferably, the instruction information sent by the base station to the user equipment may include a detection stop moment, a first time interval, or a second time interval, so that the user equipment stops detecting the signal on the unlicensed spectrum channel according to the instruction information.

Optionally, the instruction information includes a detection stop moment, and the instruction information is used to instruct the user equipment to stop detecting the signal on the unlicensed spectrum channel at the detection stop moment.

For example, the base station may determine the instruction information according to an uplink-downlink subframe configuration. For example, the uplink-downlink subframe configuration is ⅔. That is, the base station receives two uplink subframes each time it sends three downlink subframes, or the base station sends three downlink subframes each time it receives two uplink subframes. Optionally, the base station may instruct, by using the instruction information, the user equipment to stop detection at a start moment of each uplink subframe. Optionally, the base station may instruct, by using the instruction information, the user equipment to stop detection at a start moment of the first uplink subframe.

Optionally, the detection stop moment is used to instruct the user equipment to stop detecting the signal on the unlicensed spectrum channel according to the detection stop moment, and may specifically instruct the user equipment to stop detecting the signal on the unlicensed spectrum channel in a current subframe, the $M^{th}$ subframe following the current subframe, or the $N^{th}$ symbol following a current symbol.

Alternatively, the instruction information includes a first time interval, and the instruction information is used to instruct the user equipment to stop detecting the signal on the unlicensed spectrum channel after the first time interval.

Optionally, the instruction information includes a second time interval, and the instruction information is used to instruct the user equipment to stop detecting the signal on the unlicensed spectrum channel within the second time interval.

In still another optional implementation, if the base station determines, according to system collision detection, transmission duration information of another device that occupies the unlicensed spectrum channel, the base station sends the instruction information to the user equipment. In this case, preferably, the instruction information sent by the base station to the user equipment may include a detection stop moment, a first time interval, or a second time interval. Alternatively, if the base station determines, according to system collision detection, transmission duration information of another device that occupies the unlicensed spectrum channel and determines a random backoff number during extended clear channel assessment ECCA detection, the base station sends the instruction information to the user equipment. In this case, preferably, the instruction information sent by the base station to the user equipment may include the transmission duration information of the another device that occupies the unlicensed spectrum channel, a detection stop moment, the random backoff number, a first time interval, or a second time interval.

The system collision detection means the following: When detecting a signal of a Wi-Fi system, an LAA-LTE system, or another system on the unlicensed spectrum channel, the base station or the user equipment obtains information about whether the base station collides with the Wi-Fi system, the LAA-LTE system, or the another system on the unlicensed spectrum channel. If a collision is detected, the base station may further obtain transmission duration information of another device that currently occupies the unlicensed spectrum channel.

Optionally, the instruction information may be carried in public DCI on a physical downlink control channel PDCCH or an enhanced physical downlink control channel EPDCCH and sent to the user equipment; or the instruction information may be sent to the user equipment over a broadcast channel. That is, the base station may notify multiple user equipments in a collective notification manner to reduce signaling overheads.

Optionally, the instruction information may be carried in UE-specific DCI on a physical downlink control channel PDCCH or an enhanced physical downlink control channel EPDCCH and sent to the user equipment. That is, the base station may notify user equipments one by one, so that user equipment that is not scheduled stops detecting a signal on an unlicensed spectrum according to the instruction information, so as to reduce power consumption of the user equipment.

Optionally, the instruction information may be sent to the user equipment in a symbol preceding a beginning of a current subframe, the first symbol of the current subframe, or the first several symbols of the current subframe, so that the user equipment determines whether it needs to stop detecting the signal on the unlicensed spectrum channel in the current subframe.

Optionally, the instruction information may be sent to the user equipment by using higher layer signaling.

Optionally, the instruction information may include a maximum random backoff number, and the maximum random backoff number may be determined by a length of a contention window. The instruction information is sent to the user equipment by using higher layer signaling. In this way, the user equipment determines by itself a time interval in which the base station cannot access the unlicensed spectrum channel, and further determines to stop detecting the signal on the unlicensed spectrum channel within the time interval.

Optionally, the instruction information may be sent to the user equipment by using a PDCCH, an EPDCCH, a broadcast channel, or higher layer signaling on a licensed spectrum channel. The instruction information may be sent to the user equipment by using a PDCCH, an EPDCCH, a broadcast channel, or higher layer signaling of an unlicensed spectrum channel that is being used. The user equipment is occupying the unlicensed spectrum channel, that is, the user equipment is communicating with the base station over the unlicensed spectrum channel. If the base station sends the instruction information over the unlicensed spectrum channel, the user equipment may also detect the instruction information.

Further, the instruction information may carry identifier information of the user equipment. When receiving the instruction information, the user equipment first detects whether its identifier information is included in the instruction information; if a detection result is yes, the user equipment stops detecting the signal on the unlicensed spectrum channel according to the instruction information, where the identifier information of the user equipment may be a UE ID of the user equipment, a cell ID of the user equipment, or the like.

Further, the instruction information may carry identifier information of the unlicensed spectrum channel. In this way, when receiving the instruction information, the user equipment stops detecting the unlicensed spectrum channel indicated by the identifier information of the unlicensed spectrum channel. For example, the base station predefines four unlicensed spectrum channels: A, B, C, and D, and the instruction information carries identifier information of unlicensed spectrum channel D. In this case, the user equipment stops detecting a signal on unlicensed spectrum channel D according to the instruction information.

In the embodiment shown in FIG. 4, a base station sends instruction information to user equipment, so that when receiving the instruction information sent by the base station, the user equipment stops detecting a signal on an unlicensed spectrum channel according to the instruction information, stops detecting a signal on an unlicensed spectrum channel according to the instruction information.

It should be noted that the foregoing two procedures corresponding to FIG. 3 and FIG. 4 may coexist in a same embodiment, or one of the procedures is adopted together with the prior art in an embodiment. This is not limited in the embodiments of the present invention.

Figure 5:
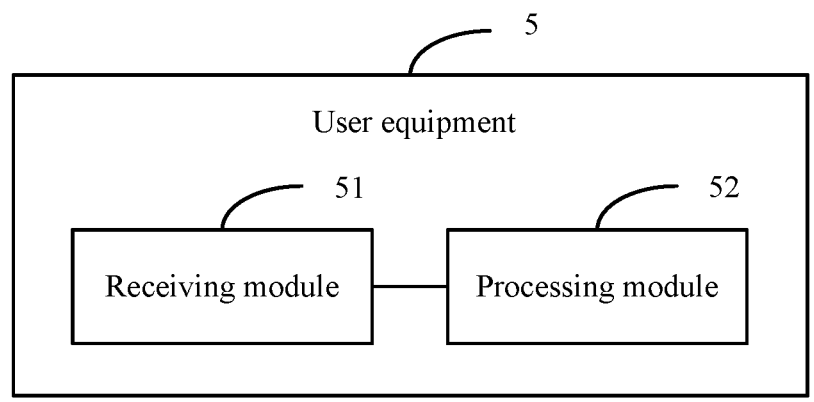
FIG. 5 is a schematic structural diagram of user equipment according to an embodiment of the present invention.

Referring to FIG. 5, FIG. 5 is a schematic structural diagram of user equipment according to an embodiment of the present invention.

As shown in FIG. 5, the user equipment 5 may include at least a receiving module 51 and a processing module 52.

In an optional implementation, the receiving module 51 is configured to receive instruction information sent by a base station.

The processing module 52 is configured to start to detect a signal on an unlicensed spectrum channel according to the instruction information.

The instruction information received by the receiving module 51 includes a random backoff number, and the processing module 52 may determine, according to the random backoff number, a first moment when the base station obtains permission to use the unlicensed spectrum channel, and detect the signal on the unlicensed spectrum channel according to the first moment.

The instruction information received by the receiving module 51 includes a detection start moment, and the processing module 52 may detect the signal on the unlicensed spectrum channel according to the detection start moment.

The instruction information received by the receiving module 51 includes a first time interval, and the processing module 52 may detect the signal on the unlicensed spectrum channel after the first time interval.

The instruction information received by the receiving module 51 includes a second time interval, and the processing module 52 may detect the signal on the unlicensed spectrum channel within the second time interval.

Optionally, the receiving module 51 may receive the instruction information in public DCI on a PDCCH or an EPDCCH.

Optionally, the receiving module 51 may receive the instruction information in UE-specific DCI on a PDCCH or an EPDCCH.

Optionally, the receiving module 51 may receive the instruction information by using higher layer signaling.

In another optional implementation, the receiving module 51 is configured to receive instruction information sent by a base station.

The processing module 52 is configured to stop detecting a signal on an unlicensed spectrum channel according to the instruction information.

The instruction information received by the receiving module 51 includes a random backoff number, and the processing module 52 may determine, according to the random backoff number, a first moment when the base station obtains permission to use the unlicensed spectrum channel, and stop detecting the signal on the unlicensed spectrum channel according to the first moment.

The instruction information received by the receiving module 51 includes a detection stop moment, and the processing module 52 may stop detecting the signal on the unlicensed spectrum channel according to the detection stop moment.

The instruction information received by the receiving module 51 includes a first time interval, and the processing module 52 may stop detecting the signal on the unlicensed spectrum channel after the first time interval.

The instruction information received by the receiving module 51 includes a second time interval, and the processing module 52 may stop detecting the signal on the unlicensed spectrum channel within the second time interval.

Optionally, the receiving module 51 may receive the instruction information in public DCI on a PDCCH or an EPDCCH.

Optionally, the receiving module 51 may receive the instruction information in UE-specific DCI on a PDCCH or an EPDCCH.

Optionally, the receiving module 51 may receive the instruction information by using higher layer signaling.

It may be understood that a function of each function module of the user equipment 5 in this embodiment may be specifically implemented according to the methods in the foregoing method embodiments. Reference may be made to related descriptions in the method embodiment shown in FIG. 1 or FIG. 2, and details are not described herein.

Figure 6:
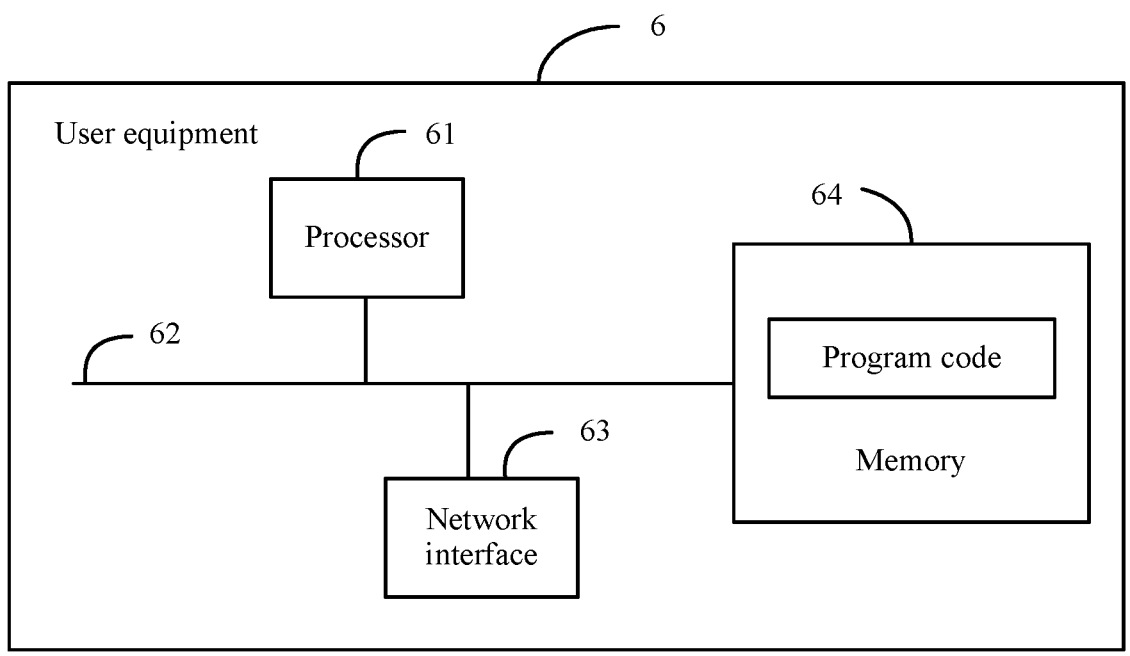
FIG. 6 is a schematic structural diagram of another user equipment according to an embodiment of the present invention.

FIG. 6 is a schematic structural diagram of another user equipment according to an embodiment of the present invention. As shown in FIG. 6, the user equipment 6 may include at least one processor 61, such as a CPU, and at least one communications bus 62, network interface 63, and memory 64. The communications bus 62 is configured to implement connections and communication between these components. The memory 64 may be a high-speed RAM memory or a non-volatile memory, such as at least one magnetic disk storage. Optionally, the memory 64 may be at least one storage apparatus far away from the processor 61.

In an optional implementation, the memory 64 stores a set of program code, and the processor 61 is configured to invoke the program code stored in the memory 64, so as to perform the following operations: receiving instruction information sent by a base station; and starting to detect a signal on an unlicensed spectrum channel according to the instruction information.

The instruction information includes a random backoff number; and the starting, by the processor 61, to detect a signal on an unlicensed spectrum channel according to the instruction information may be specifically: determining, according to the random backoff number, a first moment when the base station obtains permission to use the unlicensed spectrum channel, and detecting the signal on the unlicensed spectrum channel according to the first moment.

The instruction information includes a detection start moment; and the starting, by the processor 61, to detect a signal on an unlicensed spectrum channel according to the instruction information may be specifically: detecting the signal on the unlicensed spectrum channel according to the detection start moment.

The instruction information includes a first time interval; and the starting, by the processor 61, to detect a signal on an unlicensed spectrum channel according to the instruction information may be specifically: detecting the signal on the unlicensed spectrum channel after the first time interval.

The instruction information includes a second time interval; and the starting, by the processor 61, to detect a signal on an unlicensed spectrum channel according to the instruction information may be specifically: detecting the signal on the unlicensed spectrum channel within the second time interval.

Optionally, the network interface 63 may receive the instruction information in public DCI on a PDCCH or an EPDCCH.

Optionally, the network interface 63 may receive the instruction information in UE-specific DCI on a PDCCH or an EPDCCH.

Optionally, the network interface 63 may receive the instruction information by using higher layer signaling.

In another optional implementation, the memory 64 stores a set of program code, and the processor 61 is configured to invoke the program code stored in the memory 64, so as to perform the following operations: receiving instruction information sent by a base station; and stopping detecting a signal on an unlicensed spectrum channel according to the instruction information.

The instruction information includes a random backoff number; and the stopping detecting, by the processor 61, a signal on an unlicensed spectrum channel according to the instruction information may be specifically: determining, according to the random backoff number, a first moment when the base station obtains permission to use the unlicensed spectrum channel, and stopping detecting the signal on the unlicensed spectrum channel according to the first moment.

The instruction information includes a detection stop moment; and the stopping, by the processor 61, to detect a signal on an unlicensed spectrum channel according to the instruction information may be specifically: stopping detecting the signal on the unlicensed spectrum channel according to the detection stop moment.

The instruction information includes a first time interval; and the stopping, by the processor 61, to detect a signal on an unlicensed spectrum channel according to the instruction information may be specifically: stopping detecting the signal on the unlicensed spectrum channel after the first time interval.

The instruction information includes a second time interval; and the stopping, by the processor 61, to detect a signal on an unlicensed spectrum channel according to the instruction information may be specifically: stopping detecting the signal on the unlicensed spectrum channel within the second time interval.

Optionally, the network interface 63 may receive the instruction information in public DCI on a PDCCH or an EPDCCH.

Optionally, the network interface 63 may receive the instruction information in UE-specific DCI on a PDCCH or an EPDCCH.

Optionally, the network interface 63 may receive the instruction information by using higher layer signaling.

It may be understood that a function of each function module of the user equipment 6 in this embodiment may be specifically implemented according to the methods in the foregoing method embodiments. Reference may be made to related descriptions in the method embodiment shown in FIG. 1 or FIG. 2, and details are not described herein.

Figure 7:
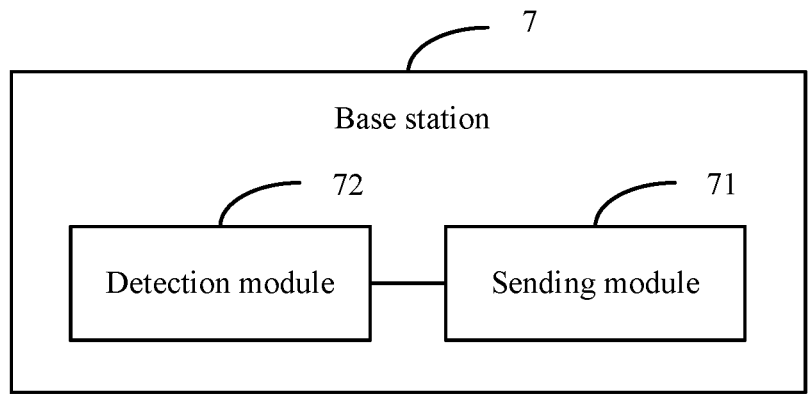
FIG. 7 is a schematic structural diagram of a base station according to an embodiment of the present invention.

Referring to FIG. 7, FIG. 7 is a schematic structural diagram of a base station according to an embodiment of the present invention.

As shown in FIG. 7, the base station 7 may include at least a sending module 71.

In an optional implementation, the sending module 71 is configured to send instruction information to user equipment, where the instruction information is used to instruct the user equipment to start to detect a signal on an unlicensed spectrum channel.

Further, as shown in FIG. 7, the base station may further include a detection module 72.

Optionally, the detection module 72 is configured to determine that a random backoff number obtained during extended clear channel assessment ECCA detection is less than or equal to a first preset threshold, and trigger the sending module 71 to send the instruction information to the user equipment.

Optionally, the detection module 72 is configured to determine that a random backoff number obtained during extended clear channel assessment ECCA detection is greater than or equal to a second preset threshold, and trigger the sending module 71 to send the instruction information to the user equipment.

Optionally, the detection module 72 is configured to determine to schedule the user equipment on the unlicensed spectrum channel, and trigger the sending module 71 to send the instruction information to the user equipment.

Optionally, the detection module 72 is configured to determine to send downlink data on the unlicensed spectrum channel, and trigger the sending module 71 to send the instruction information to the user equipment.

The instruction information sent by the sending module 71 includes a random backoff number, and the instruction information is used to instruct the user equipment to detect the signal on the unlicensed spectrum channel according to the random backoff number.

The instruction information sent by the sending module 71 includes a detection start moment, and the instruction information is used to instruct the user equipment to detect the signal on the unlicensed spectrum channel according to the detection start moment.

The instruction information sent by the sending module 71 includes a first time interval, and the first time interval is used to instruct the user equipment to detect the signal on the unlicensed spectrum channel after the first time interval.

The instruction information sent by the sending module 71 includes a second time interval, and the second time interval is used to instruct the user equipment to detect the signal on the unlicensed spectrum channel within the second time interval.

The instruction information may be carried in public DCI on a PDCCH or an EPDCCH and sent to the user equipment.

The instruction information may be carried in UE-specific DCI on a PDCCH or an EPDCCH and sent to the user equipment.

The instruction information may be sent to the user equipment by using higher layer signaling.

In another optional implementation, the sending module 71 is configured to send instruction information to user equipment, where the instruction information is used to instruct the user equipment to stop detecting a signal on an unlicensed spectrum channel.

Further, as shown in FIG. 7, the base station may further include a detection module 72.

Optionally, the detection module 72 is configured to determine that a random backoff number obtained during extended clear channel assessment ECCA detection is less than or equal to a first preset threshold, and trigger the sending module 71 to send the instruction information to the user equipment.

Optionally, the detection module 72 is configured to determine that a random backoff number obtained during extended clear channel assessment ECCA detection is greater than or equal to a second preset threshold, and trigger the sending module 71 to send the instruction information to the user equipment.

Optionally, the detection module 72 is configured to determine not to schedule the user equipment on the unlicensed spectrum channel, and trigger the sending module 71 to send the instruction information to the user equipment.

Optionally, the detection module 72 is configured to determine to receive uplink data on the unlicensed spectrum channel, and trigger the sending module 71 to send the instruction information to the user equipment.

The instruction information sent by the sending module 71 includes a detection stop moment, and the instruction information is used to instruct the user equipment to stop detecting the signal on the unlicensed spectrum channel according to the detection stop moment.

The instruction information sent by the sending module 71 includes a first time interval, and the instruction information is used to instruct the user equipment to stop detecting the signal on the unlicensed spectrum channel after the first time interval.

The instruction information sent by the sending module 71 includes a second time interval, and the instruction information is used to instruct the user equipment to stop detecting the signal on the unlicensed spectrum channel within the second time interval.

The instruction information may be carried in public DCI on a PDCCH or an EPDCCH and sent to the user equipment.

The instruction information may be carried in UE-specific DCI on a PDCCH or an EPDCCH and sent to the user equipment.

The instruction information may be sent to the user equipment by using higher layer signaling.

It may be understood that a function of each function module of the base station 7 in this embodiment may be specifically implemented according to the methods in the foregoing method embodiments. Reference may be made to related descriptions in the method embodiment shown in FIG. 3 or FIG. 4, and details are not described herein.

Figure 8:
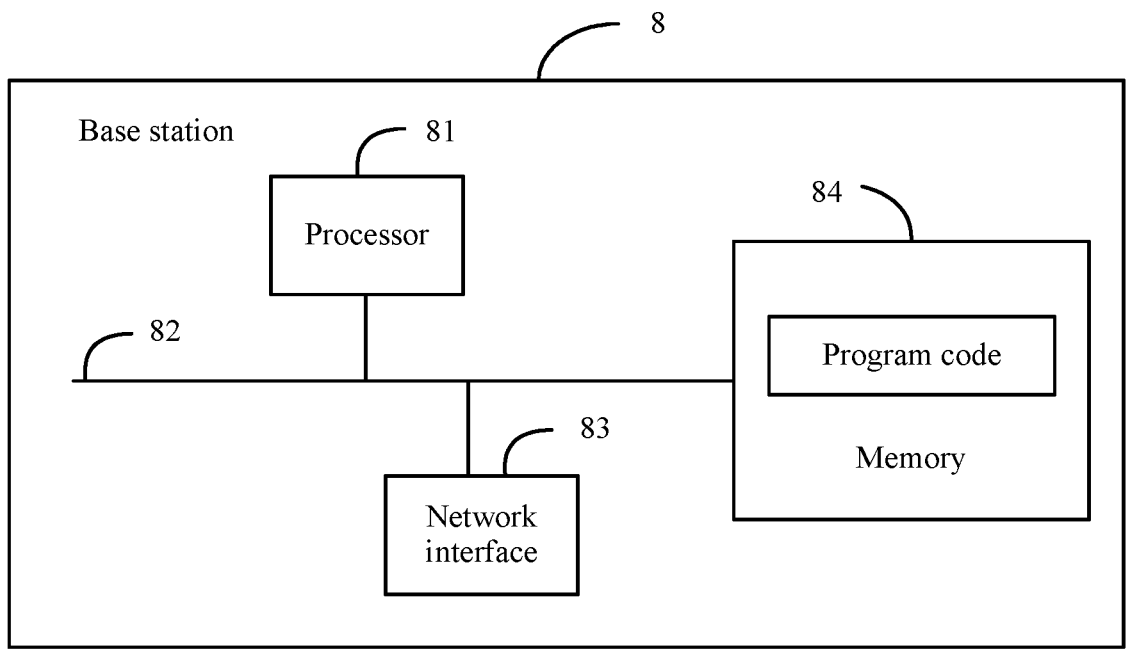
FIG. 8 is a schematic structural diagram of another base station according to an embodiment of the present invention.

FIG. 8 is a schematic structural diagram of another base station according to an embodiment of the present invention. As shown in FIG. 8, the base station 8 may include at least one processor 81, such as a CPU, and at least one communications bus 82, network interface 83, and memory 84. The communications bus 82 is configured to implement connections and communication between these components. The memory 84 may be a high-speed RAM memory or a non-volatile memory, such as at least one magnetic disk storage. Optionally, the memory 84 may be at least one storage apparatus far away from the processor 81.

In an optional implementation, the memory 84 stores a set of program code, and the processor 81 is configured to invoke the program code stored in the memory 84, so as to perform the following operation: sending instruction information to user equipment, where the instruction information is used to instruct the user equipment to start to detect a signal on an unlicensed spectrum channel.

Optionally, the processor 81 may further perform the following operation: determining that a random backoff number obtained during extended clear channel assessment ECCA detection is less than or equal to a first preset threshold.

Optionally, the processor 81 may further perform the following operation: determining that a random backoff number obtained during extended clear channel assessment ECCA detection is greater than or equal to a second preset threshold.

Optionally, the processor 81 may further perform the following operation: determining to schedule the user equipment on the unlicensed spectrum channel.

Optionally, the processor 81 may further perform the following operation: determining to send downlink data on the unlicensed spectrum channel.

The instruction information includes the random backoff number, and the instruction information is used to instruct the user equipment to detect the signal on the unlicensed spectrum channel according to the random backoff number.

The instruction information includes a detection start moment, and the instruction information is used to instruct the user equipment to detect the signal on the unlicensed spectrum channel according to the detection start moment.

The instruction information includes a first time interval, and the first time interval is used to instruct the user equipment to detect the signal on the unlicensed spectrum channel after the first time interval.

The instruction information includes a second time interval, and the second time interval is used to instruct the user equipment to detect the signal on the unlicensed spectrum channel within the second time interval.

The instruction information may be carried in public DCI on a PDCCH or an EPDCCH and sent to the user equipment.

The instruction information may be carried in UE-specific DCI on a PDCCH or an EPDCCH and sent to the user equipment.

The instruction information may be sent to the user equipment by using higher layer signaling.

In another optional implementation, the memory 84 stores a set of program code, and the processor 81 is configured to invoke the program code stored in the memory 84, so as to perform the following operation: sending, by the base station, instruction information to user equipment, where the instruction information is used to instruct the user equipment to stop detecting a signal on an unlicensed spectrum channel.

Optionally, the processor 81 may further perform the following operation: determining that a random backoff number obtained during extended clear channel assessment ECCA detection is less than or equal to a first preset threshold.

Optionally, the processor 81 may further perform the following operation: determining that a random backoff number obtained during extended clear channel assessment ECCA detection is greater than or equal to a second preset threshold.

Optionally, the processor 81 may further perform the following operation: determining not to schedule the user equipment on the unlicensed spectrum channel.

Optionally, the processor 81 may further perform the following operation: determining to receive uplink data on the unlicensed spectrum channel.

The instruction information includes a detection stop moment, and the instruction information is used to instruct the user equipment to stop detecting the signal on the unlicensed spectrum channel according to the detection stop moment.

The instruction information includes a first time interval, and the instruction information is used to instruct the user equipment to stop detecting the signal on the unlicensed spectrum channel after the first time interval.

The instruction information includes a second time interval, and the instruction information is used to instruct the user equipment to stop detecting the signal on the unlicensed spectrum channel within the second time interval.

The instruction information may be carried in public DCI on a PDCCH or an EPDCCH and sent to the user equipment.

The instruction information may be carried in UE-specific DCI on a PDCCH or an EPDCCH and sent to the user equipment.

The instruction information may be sent to the user equipment by using higher layer signaling.

It may be understood that a function of each function module of the base station 8 in this embodiment may be specifically implemented according to the methods in the foregoing method embodiments. Reference may be made to related descriptions in the method embodiment shown in FIG. 3 or FIG. 4, and details are not described herein.

An embodiment of the present invention further provides a computer storage medium, and the computer storage medium stores a program. When the program is executed, some or all of the steps in the methods described with reference to FIG. 1 and FIG. 2 in the embodiments of the present invention are performed.

An embodiment of the present invention further provides a computer storage medium, and the computer storage medium stores a program. When the program is executed, some or all of the steps in the methods described with reference to FIG. 3 and FIG. 4 in the embodiments of the present invention are performed.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A method for detecting a signal on an unlicensed spectrum channel the method comprising:
   receiving, by user equipment (UE), instruction information from a base station, wherein the instruction information comprises a random backoff number;
   determining, by the UE, according to the random backoff number, a time when the base station is permitted to use the unlicensed spectrum channel; and
   detecting, by the UE, the signal on the unlicensed spectrum channel according to the time.

2. The method according to claim 1, wherein the receiving the instruction information comprises:
   receiving the instruction information in public DCI on a PDCCH or an EPDCCH.

3. The method according to claim 1, wherein the receiving the instruction information comprises:
   receiving the instruction information in UE-specific DCI on a PDCCH or an EPDCCH.

4. The method according to claim 1, wherein the receiving the instruction information comprises:
   receiving the instruction information by using higher layer signaling.

5. A method for detecting a signal on an unlicensed spectrum channel, performed by a base station, the method comprising:
   sending instruction information to user equipment (UE), wherein the instruction information comprises a random backoff number, wherein the random backoff number indicates, to the UE, a time when the base station is permitted to use the unlicensed spectrum channel, and wherein the UE detects a signal on the unlicensed spectrum channel according to the time.

6. The method according to claim 5, further comprising:
   determining that the random backoff number obtained during extended clear channel assessment (ECCA) detection is less than or equal to a first preset threshold.

7. The method according to claim 5, further comprising:
   determining that the random backoff number obtained during extended clear channel assessment (ECCA) detection is greater than or equal to a second preset threshold.

8. The method according to claim 5, further comprising: scheduling the user equipment on the unlicensed spectrum channel.

9. The method according to claim 5, further comprising: sending downlink data on the unlicensed spectrum channel.

10. User equipment comprising:
a processor; and
a memory storing a program to be executed in the processor, the program comprising instructions for:
receiving instruction information from a base station, wherein the instruction information comprises a random backoff number;
determining according to the random backoff number, a time when the base station is permitted to use an unlicensed spectrum channel; and
detecting a signal on the unlicensed spectrum channel according to the time.

11. The user equipment according to claim 10, wherein the instructions for receiving the instruction information comprises instructions for receiving the instruction information in public DCI on a PDCCH or an EPDCCH.

12. The user equipment according to claim 10, wherein the instructions for receiving the instruction information comprises instructions for receiving the instruction information in UE-specific DCI on a PDCCH or an EPDCCH.

13. The user equipment according to claim 10, wherein the instructions for receiving the instruction information comprises instructions for receiving the instruction information by using higher layer signaling.

14. A base station comprising:
a processor; and
a memory storing a program to be executed in the processor, the program comprising instructions for:
sending instruction information to user equipment (UE), wherein the instruction information comprises a random backoff number, wherein the random backoff number indicates, to the UE, a time when the base station is permitted to use an unlicensed spectrum channel, and wherein the UE detects a signal on the unlicensed spectrum channel according to the time.

15. The base station according to claim 14, wherein the program further comprises instructions for determining that the random backoff number obtained during extended clear channel assessment (ECCA) detection is less than or equal to a first preset threshold.

16. The base station according to claim 14, wherein the program further comprises instructions for determining that the random backoff number obtained during extended clear channel assessment (ECCA) detection is greater than or equal to a second preset threshold.

17. The base station according to claim 14, wherein the program further comprises instructions for scheduling the user equipment on the unlicensed spectrum channel.

18. The base station according to claim 14, wherein the program further comprises instructions for sending downlink data on the unlicensed spectrum channel.

* * * * *